Aug. 16, 1938.    L. A. CLARKE    2,127,325
SOLVENT REFINING OF HYDROCARBON OIL
Filed Oct. 2, 1936
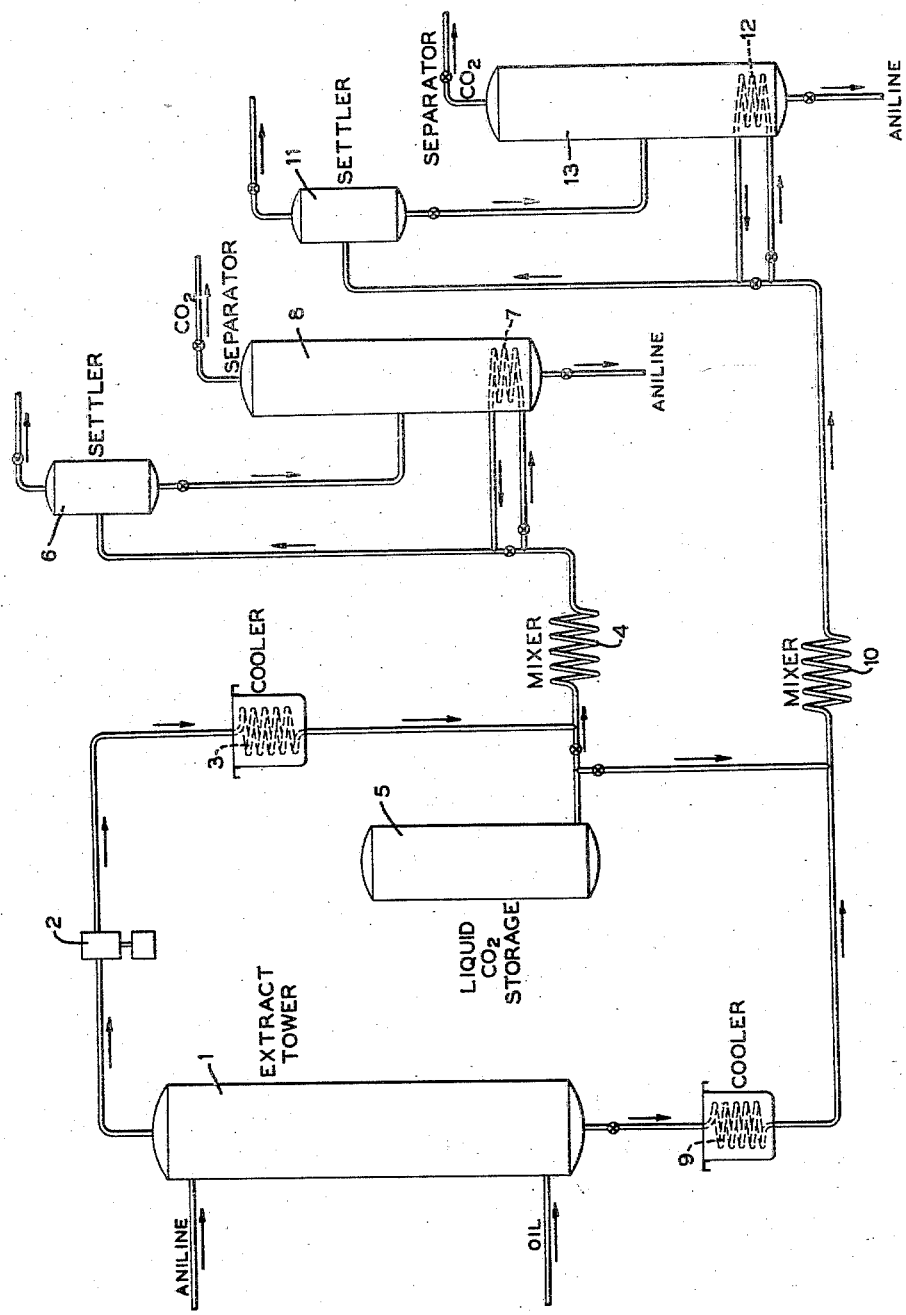
Louis A. Clarke
INVENTOR
BY R. J. Dearborn
ATTORNEY Patented Aug. 16, 1938

2,127,325

UNITED STATES PATENT OFFICE 2,127,325

SOLVENT REFINING OF HYDROCARBON OIL

Louis A. Clarke, Fishkill, N. Y., assignor to The Texas Company, New York, N. Y., a corporation of Delaware Application October 2, 1936, Serial No. 103,660

2 Claims. (Cl. 196—13)

This invention relates to a process for solvent refining of hydrocarbon oil, and more particularly for refining petroleum and fractions derived therefrom.

The invention contemplates refining oil with a selective solvent of the amine type, such as aniline, toluidine, etc. It contemplates a method in which the amine solvent is recovered from the oil subsequent to the refining operation by treating the mixture of oil and amine with carbon dioxide under conditions of temperature and pressure such that the amine and carbon dioxide form an addition compound which is substantially immiscible with the oil so that the compound can thus be readily separated from the oil by decantation or other means. In this form, the amine is separated from the oil and is subsequently recovered for reuse upon decomposition of the addition compound.

It has been discovered that amine compounds, such as aniline, toluidine, xylidene, etc., when mixed with liquid carbon dioxide, in substantially equal molecular proportions, form compounds which are stable under pressure and which decompose with reversion to the original compounds when the pressure is released. For example, it has been found that aniline and carbon dioxide, while under a pressure of 40 atmospheres, combine in equal molecular proportions to form a compound which crystallizes at about 46° F. forming transparent white needles. At a temperature of about 50° F., the compound is in liquid form. When the pressure is released, the compound decomposes into the original compounds, aniline and carbon dioxide. The addition compound is not formed in the presence of water under the above conditions, and therefore dry or anhydrous carbon dioxide is employed.

In effecting the formation of this addition compound, when using carbon dioxide, it is contemplated employing temperatures of around 50° to 86° F. and pressures in the range about 666 to 1067 pounds per square inch gauge.

It is also contemplated that other acidic gases besides carbon dioxide may be used, as for example sulphur dioxide and hydrogen sulphide.

Accordingly, my invention involves the application of the above principle to the solvent refining of hydrocarbon oil, such as mineral oils, as a means of recovering selective solvents of the amine type from the oil undergoing treatment. This method of recovery is advantageously applied where the oil undergoing treatment is a gasoline fraction, and in which case the boiling point of the solvent is within the boiling range of the gasoline fraction undergoing treatment, so that it is impossible to separate the solvent from the gasoline by the conventional distillation methods.

In practicing the invention, the oil to be treated, which may be gasoline, naphtha, or a lubricating oil fraction of petroleum, is mixed with a selective solvent of the amine type, such as aniline. The mixture of aniline and oil is separated into extract and raffinate phases. The extract phase comprises the bulk of the solvent with the soluble constituents of the oil dissolved therein. The raffinate phase comprises the insoluble portion of the oil together with a relatively small amount of the solvent liquid.

Thus, in the usual solvent refining operation, the extract phase comprises the so-called naphthenic constituents dissolved in the solvent, while the raffinate phase comprises the so-called paraffinic constituents of the oil mixed with a small amount of the solvent.

These two phases are separated and, in accordance with the method of my invention, are separately treated with liquid carbon dioxide under the proper conditions of temperature and pressure. The aniline combines with the carbon dioxide to form a compound, as already explained, which, if the temperature is sufficiently low, will be in crystalline form; or, at a slightly higher temperature, will be in a liquid form. When it is in solid form, the crystals will, upon standing, separate, leaving the oil substantially free from the solvent and in a condition such that it may be withdrawn by decantation.

On the other hand, where the intermediate compound is in a liquid state, its separation from the oil may be effected by permitting the mixture to settle and separate into layers. The hydrocarbon layer is removed as an upper layer, while the solvent compound is withdrawn as a bottom layer.

In order to illustrate the application of my invention to the solvent refining of mineral oil, reference will now be made to the accompanying flow diagram.

The oil to be treated is withdrawn from a source not shown and introduced to the lower portion of an extraction tower 1, while the solvent, aniline, is also conducted from a source not shown and introduced to the upper portion of the extraction tower in the proportion of about one to three parts aniline to about one part oil. This extraction tower is advantageously of the conventional packed type, adapted to effect countercurrent contact between the oil and the solvent.

The raffinate phase accumulates in the upper portion of the tower, while the extract phase accumulates in the lower portion thereof.

The raffinate phase is continuously removed and conducted by a pump 2 through a cooling coil 3 and a mixing coil 4. It may not be necessary to subject the raffinate to cooling, depending, of course, upon the temperature at which the extraction is carried out in the extraction tower 1. If the extraction is made at a temperature of around 30° F., the raffinate phase may not require any further cooling.

The extraction temperature, in turn, depends upon the degree of extraction desired as well as upon the nature of the stock undergoing treatment. For example, when extracting gasoline, the temperature may range from 32° to 100° F., while in the case of a lubricating oil stock the temperature may range from 120° to 210° F.

Liquid carbon dioxide is conducted from a tank 5 and commingled with the raffinate phase prior to its introduction to the mixing coil 4. Complete mixing is effected within the coil 4 under superatmospheric pressure imposed upon the mixture by the pump 2. The carbon dioxide is mixed with the raffinate phase in equal molecular proportions with the aniline contained in the raffinate phase.

The mixture is conducted from the mixing oil 4 to a settling tank 6. If desired, all or a portion thereof may be by-passed through a coil 7 located within a separator 8 to which reference will be made later. The mixture of carbon dioxide and raffinate phase is allowed to settle in the settling tank 6, while still maintained under superatmospheric pressure sufficient to cause the aniline and the carbon dioxide to combine to form the addition compound. Separation into phases occurs within the tank 6, and the raffinate oil, substantially free from the solvent, is withdrawn from the upper portion thereof as indicated.

The addition compound formed by the aniline and the carbon dioxide is withdrawn from the bottom of the tank 6 and conducted to the separator 8, previously referred to. The pressure within the separator 8 is released so that the carbon dioxide vaporizes and decomposition of the reaction compound occurs. The vaporization of the carbon dioxide results in a refrigerating effect, and this is utilized to cool the mixture of carbon dioxide and raffinate phase passing through the coil 7 within the separator 8. As a result of the reduction in pressure, the addition compound is decomposed into aniline and carbon dioxide. The carbon dioxide is withdrawn, as indicated, and is then conducted to a compressor not shown, wherein it is liquefied and returned to the storage tank 5.

The separated aniline is withdrawn from the bottom of the separator 8, and is available for mixing with fresh oil in the extraction tower 1.

In a similar manner, the extract phase is continuously withdrawn from the bottom of the extraction tower 1 through a cooling coil 9 and from there through a mixing coil 10.

As already indicated, in connection with the raffinate phase, the cooling of the extract phase may be omitted.

Carbon dioxide in the proper proportion is mixed with the extract phase prior to its passage through the mixing coil 10, and from there the mixture is conducted to a settling tank 11, similar to the settling tank 6. Also, the mixture of aniline and carbon dioxide may be by-passed, all or in part, through a cooling coil 12, located within the separator 13, similar to the separator 8.

The mixture within the settling tank 11, and under superatmospheric pressure, separates into phases or layers. The oil layer comprising an extract oil is removed from the upper portion thereof, while the addition compound of aniline and carbon dioxide is removed from the lower portion of the settling tank to the separator 13, already referred to.

The pressure is released within the separator 13 so that the compound decomposes into its components, carbon dioxide and aniline, which are removed therefrom for reuse in a manner similar to that described in connection with the recovery of this compound from the raffinate phase.

Obviously, many modifications and variations of the invention, as hereinbefore set forth, may be made without departing from the spirit and scope thereof, and therefore only such limitations should be imposed as are indicated in the appended claims.

I claim:

1. In the refining of hydrocarbon oil by solvent extraction with an amine type of extraction solvent at a temperature above about 50° F., the method of recovering the amine from the oil comprising mixing the oil containing the amine with anhydrous carbon dioxide under a pressure substantially elevated above atmospheric such that the amine and carbon dioxide combine forming an addition compound which is substantially immiscible with the oil and which decomposes upon reduction of pressure to atmospheric without application of heat, passing the mixture to a settling zone maintained under said elevated pressure, withdrawing therefrom the addition compound, introducing the withdrawn compound to a zone of reduced pressure to decompose into carbon dioxide and the original amine, and refrigeratively vaporizing the carbon dioxide therefrom while in indirect thermal contact with the mixture being charged to said settling zone, thereby cooling the mixture to a temperature of 50° F. and below.

2. The method according to claim 1 in which the amine comprises aniline.

LOUIS A. CLARKE.